Sept. 7, 1943.                W. R. PRITCHETT                2,329,079
                         MEASURING INSTRUMENT POINTER
                             Filed April 11, 1942

WITNESSES:

INVENTOR
Willis R. Pritchett.
BY
ATTORNEY

Patented Sept. 7, 1943

2,329,079

UNITED STATES PATENT OFFICE 2,329,079

MEASURING INSTRUMENT POINTER

Willis Ralph Pritchett, Bloomfield, N. J., assignor to Westinghouse Electric & Manufacturing Company, East Pittsburgh, Pa., a corporation of Pennsylvania Application April 11, 1942, Serial No. 438,569

4 Claims. (Cl. 116—129)

The present invention relates to electrical measuring instruments, and it has particular relation to a pointer and balance-weight structure for such instruments.

Because of a relatively small size of the parts involved, the provision of a satisfactory balance weight structure for electrical instrument pointers has been a difficult problem in the art. One type of balance structure comprises long threaded nuts which are screwed onto threaded portions of the pointer cross arm or balance arm. In this particular arrangement, it is necessary that the very fine threads be provided in the nut and on the balance arm with the result that expensive taps and dies are required. In addition, the labor involved in providing such an arrangement is relatively expensive.

Another type of balance weight which is widely used in the art involves a helically wound wire spring coiled about the balance arm. With this arrangement the parts must be of sizes which correspond within relatively small tolerances with the result that the product is unduly expensive. In such arrangements, it is often found necessary to provide threads for the helical springs which also increases the expense involved.

The present invention, however, provides a balance weight which may be stamped from a thin sheet of metal with the result that the tedious and expensive operations mentioned above are rendered unnecessary. The sheet metal stamping may then be conveniently shaped so as to releasably engage the balance arms of the pointer structure in such a manner that the weight may be easily adjusted in position thereon.

It is accordingly an object of the present invention to provide a novel and improved pointer structure for use in electrical measuring instruments.

Another object of the invention is to provide a relatively simple and inexpensive stamped balance weight for use on the balance arms of pointers for electrical instruments.

Other objects and advantages of the invention will appear from the following detailed description read in conjunction with the accompanying drawing, in which.

Figure 1:
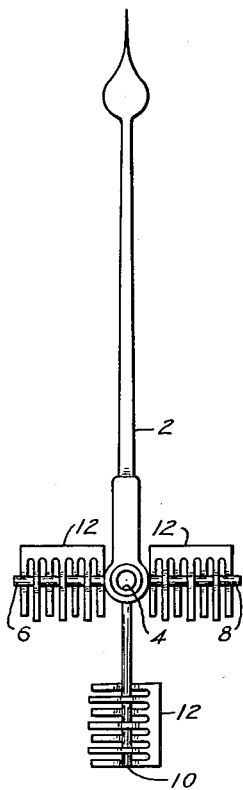
Figure 1 is a plan view of an assembled pointer structure designed in accordance with the present invention.
Figure 2:
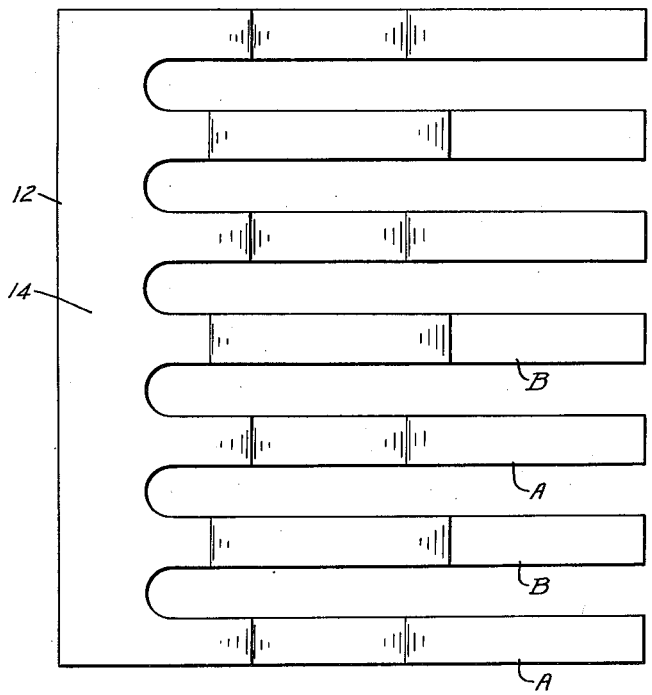
Fig. 2 is a plan view of the balance weight of the present invention during one of the steps in its manufacture.
Figure 3:
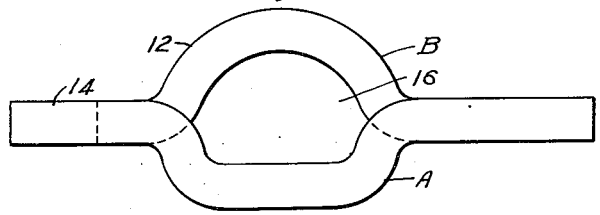
Fig. 3 is an elevational view of the weight of Fig. 2.

The structure shown in Fig. 1 comprises a pointer designated as 2 and having an opening 4 adapted for attachment to the shaft of the moving coil or the like of an electrical measuring instrument. Balance or cross arms 6, 8 and 10 extend from the inner end of the pointer 4 in mutually perpendicular directions to facilitate balancing the pointer in a manner well known in the art. Balance weights 12, which are shown more in detail in Figs. 2, 3 and 4, are attached to these cross arms.

Each of these balance weights 12 is made from a thin strip of somewhat flexible material such as phosphor bronze of some like metal. It is preferably stamped from a flat sheet of material to comprise a main portion 14 from which perpendicular arms alternately designated as A and B project. The arms A are first pressed downwardly intermediate their ends, as shown in Fig. 3, while the other arms B are curved upwardly out of the plane of the strip to provide a central longitudinal opening designated as 16 for engagement with the balance arms of the instrument.

Figure 4:
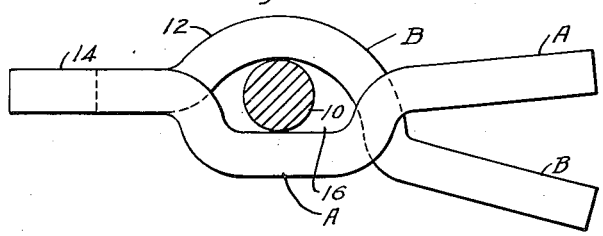
Fig. 4 is a view similar to Fig. 3, showing the weight in its completed condition and in position on the balance arm of a pointer structure.

In the final step of shaping the weight, the free ends of the alternate arms are pressed into a crossed position as shown in Fig. 4, so that the size of the opening 16 is normally smaller than the diameter of the shaft 10 on which the weight is to be mounted. The weight may then readily be placed on the cross arms as shown in Fig. 1 by compressing the free ends of the arms of the completed weight toward each other to temporarily enlarge the opening 16. The natural resiliency of the material will cause the arms to tightly grip the balance arm upon being released. In this same manner, the weights may be loosened to permit their movement along the balance arms until a final balance is obtained.

Figure 5:
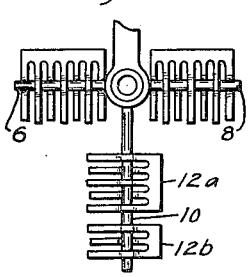
Fig. 5 is a plan view similar to Fig. 1 showing a modified arrangement of the balance weight of the present invention.

As previously pointed out, the strip material used for the weights is preferably extremely thin. As a consequence, the length of the weight may be made very nearly as great as the length of the balance arms to provide an even distribution, and bar any tendency to bend the relatively fragile balance arms. In the modification shown in Fig. 5, the long arm 10 of the pointer structure is provided with a weight made in two separate pieces designated as 12a and 12b. The portion 12b is preferably smaller than the other portion and may be located at the outer end of the arm 10 so it will be accessible for adjustment in the assembled instrument. In certain cases this particular arrangement may be preferred, since more minute adjustments in balance may be made by moving the smaller weight 12b only.

It will appear from the above that the present invention not only provides a balance weight requiring a very inexpensive piece of material, but that it may be formed into the proper shape at relatively low cost as compared to the prior art arrangements, since no threading of either it or the balance arm is required. In addition, the difference between the opened and closed positions of the arms is considerable, so that the cross arm itself need not be held to the close dimensional tolerances otherwise required. Still another important advantage of this structure is the ease with which it may be mounted, adjusted or removed without causing any undue strain on the balance arm and pointer and pivot assembly. The structure further adapts itself to provide a balance weight which may be evenly distributed over a relatively large portion of the cross arm to minimize any tendency of it to bend.

Since modifications of the particular form of the invention shown in the drawing will appear to those skilled in the art, it is intended that the invention shall be limited only by the spirit and scope of the appended claims.

I claim as my invention:

1. In combination with an indicating pointer of the type including a balance arm, a balance weight comprising a main strip of resilient material having integral arms of bendable construction spaced therealong and extending substantially perpendicularly therefrom, said arms being bent away from the plane of said strip in two groups extending about opposite sides of said balance arm in longitudinally adjustable engagement therewith the free ends of adjacent arms in crossed relationship.

2. In combination with an indicating pointer of the type including a balance arm, a balance weight comprising a main thin resilient metallic strip having integral arms of bendable construction spaced longitudinally therealong and extending substantially perpendicularly therefrom, said arms being bent away from the plane of said strip so that they alternately extend on opposite sides of said balance arm in releasable engagement therewith to permit adjustment of the weight longitudinally therealong.

3. A balance weight for an electrical measuring instrument pointer of the type having a balance arm comprising, a thin resilient metal strip shaped to provide a plurality of spaced arms extending perpendicularly from a main body portion and bent away from the plane of said strip in two groups extending about opposite sides of said balance arm for releasable engagement therewith.

4. A balance weight for an electrical measuring instrument pointer of the type having a balance arm comprising, a thin metal strip including a plurality of resilient arms extending perpendicularly from a main body portion in longitudinally spaced relationship, said arms being bent away from the plane of said strip so that they alternately extend on opposite sides of said balance arm in releasable engagement therewith and so that the free ends of alternate of said arms are in crossed relationship on the side of said balance arm opposite to said main strip.

WILLIS RALPH PRITCHETT.